US011395306B2

(12) United States Patent
Leizerovich et al.

(10) Patent No.: US 11,395,306 B2
(45) Date of Patent: *Jul. 19, 2022

(54) INTERFERING IN TIME-DIVISION DUPLEX COMMUNICATION

(71) Applicant: D-FEND SOLUTIONS AD LTD., Raanana (IL)

(72) Inventors: Hanan Leizerovich, Petah Tikva (IL); Assaf Monsa Chermon, Kfar Yedida (IL)

(73) Assignee: D-FEND SOLUTIONS AD LTD., Raanana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/946,472

(22) Filed: Jun. 23, 2020

(65) Prior Publication Data

US 2021/0084659 A1 Mar. 18, 2021

Related U.S. Application Data

(63) Continuation of application No. 16/513,769, filed on Jul. 17, 2019, now Pat. No. 10,728,906.

(30) Foreign Application Priority Data

Jul. 22, 2018 (IL) .......................... 260726

(51) Int. Cl.
*H04J 3/00* (2006.01)
*H04W 72/08* (2009.01)
(Continued)

(52) U.S. Cl.
CPC .......... *H04W 72/082* (2013.01); *H04B 7/265* (2013.01); *H04K 3/41* (2013.01);
(Continued)

(58) Field of Classification Search
CPC ............ H04W 72/082; H04W 72/0446; H04B 7/265; H04K 3/41; H04K 3/42; H04L 5/0007; H04L 5/143; H04L 5/1469
(Continued)

(56) References Cited

U.S. PATENT DOCUMENTS 4,103,236 A 7/1978 Deserno
9,416,302 B2 8/2016 Salnikov
(Continued)

FOREIGN PATENT DOCUMENTS

CN 106788873 5/2017
CN 107656543 2/2018
(Continued)

OTHER PUBLICATIONS

International Search and Written Opinion, dated Oct. 7, 2019, PCT/IL2019/05087.
(Continued)

*Primary Examiner* — Chuong T Ho
(74) *Attorney, Agent, or Firm* — Reches Patents

(57) ABSTRACT

A computer readable storage medium is presented, having computer readable program instructions thereon for causing a processor to carry out the steps of: sub-dividing a time slot into consecutive time intervals, the time slot belongs to multiple time slots allocated to a first node for transmitting to a second node using a wireless time-division duplex communication link between the first node and the second node, the second node transmitting during separate time slots allocated to said second node; and disrupting communication between said first node and said second node by transmitting, using a transmitter, respective interference signals during at least some of said time intervals, each of said interference signals being transmitted on one of said frequency bands, wherein for at least two of said time (Continued)

intervals said interference signals are transmitted on different frequency band.

19 Claims, 10 Drawing Sheets

(51) Int. Cl.
| | |
|---|---|
| H04B 7/26 | (2006.01) |
| H04K 3/00 | (2006.01) |
| H04L 5/00 | (2006.01) |
| H04L 5/14 | (2006.01) |
| H04W 72/04 | (2009.01) |

(52) U.S. Cl.
CPC ............ *H04L 5/0007* (2013.01); *H04L 5/143* (2013.01); *H04W 72/0446* (2013.01)

(58) Field of Classification Search
USPC ........................................................ 370/280
See application file for complete search history.

(56) References Cited

U.S. PATENT DOCUMENTS

| | | | |
|---|---|---|---|
| 10,728,906 B2* | 7/2020 | Leizerovich | H04L 5/143 |
| 2004/0235508 A1 | 11/2004 | Uchida | |
| 2009/0237289 A1 | 9/2009 | Stoddard | |
| 2010/0103892 A1 | 4/2010 | Abrahamsson | |
| 2010/0151808 A1 | 6/2010 | Toncich | |
| 2011/0065390 A1 | 3/2011 | Asplund | |
| 2011/0300888 A1 | 12/2011 | Sakumoto | |
| 2012/0163335 A1 | 6/2012 | Chung | |
| 2012/0264388 A1* | 10/2012 | Guo | H04B 17/345 |
| | | | 455/307 |
| 2013/0003674 A1* | 1/2013 | Lin | H04W 72/042 |
| | | | 370/329 |
| 2013/0163482 A1* | 6/2013 | Suzuki | H04L 5/1461 |
| | | | 370/278 |
| 2013/0301484 A1 | 11/2013 | Khandani | |
| 2013/0308940 A1 | 11/2013 | Kpodzo | |
| 2014/0206343 A1 | 7/2014 | Immendorf et al. | |
| 2014/0219449 A1 | 8/2014 | Shattil | |
| 2015/0139422 A1 | 5/2015 | Jover | |
| 2016/0036674 A1 | 2/2016 | Tanaka | |
| 2016/0259062 A1 | 9/2016 | Raghupathy | |
| 2018/0041956 A1 | 2/2018 | Abraham | |
| 2018/0295560 A1 | 10/2018 | Hodge | |
| 2019/0116609 A1 | 4/2019 | Feng | |
| 2019/0180542 A1 | 6/2019 | Geier | |

FOREIGN PATENT DOCUMENTS

| | | |
|---|---|---|
| JP | 2004015412 | 1/2004 |
| JP | 5647540 B2 | 12/2014 |
| WO | 1993/022850 | 11/1993 |
| WO | 1993/026124 | 12/1993 |
| WO | 2020/021529 | 1/2020 |

OTHER PUBLICATIONS

Mietzner et al., "Responsive Communications Jamming Against .Radio-Controlled Improvised Explosive Devices," IEEE Communications Magazine, 50(10): 38-46, Oct. 1, 2012.

Grover et al. "Jamming and Anti-Jamming Techniques in Wireless Networks: a Survey." International Journal of Ad Hoc and Ubiquitous Computing, 17(4): 197-215, Dec. 2014.

Karlsson et al., "Jamming a TDD Point-to-Point Link Using Reciprocity-Based MIMO," IEEE Transactions on Information Forensics and Security, 12(12): 2957-2970, Published Online Jul. 11, 2017.

Parlin "Jamming of Spread Spectrum Communications Used in UAV Remote Control Systems," Master's Thesis, Tallinn University of Technology, School of Information Technologies, Thomas Johann Seebeck Department of Electronics, Estonia, p. 1-57, May 17, 2017.

* cited by examiner

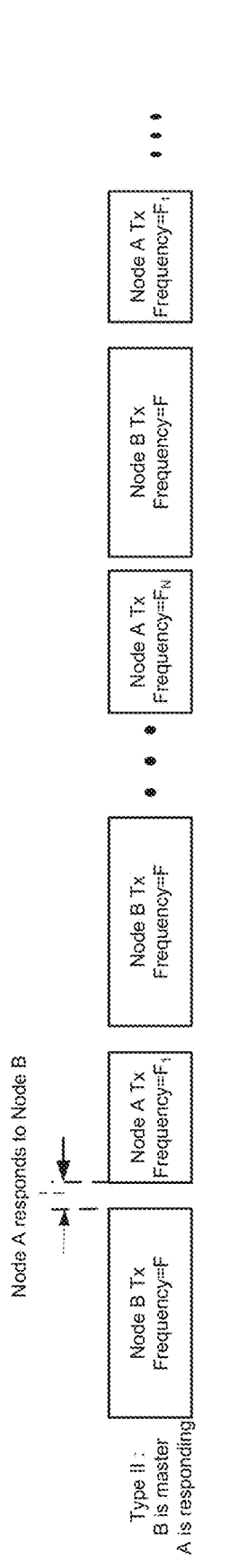
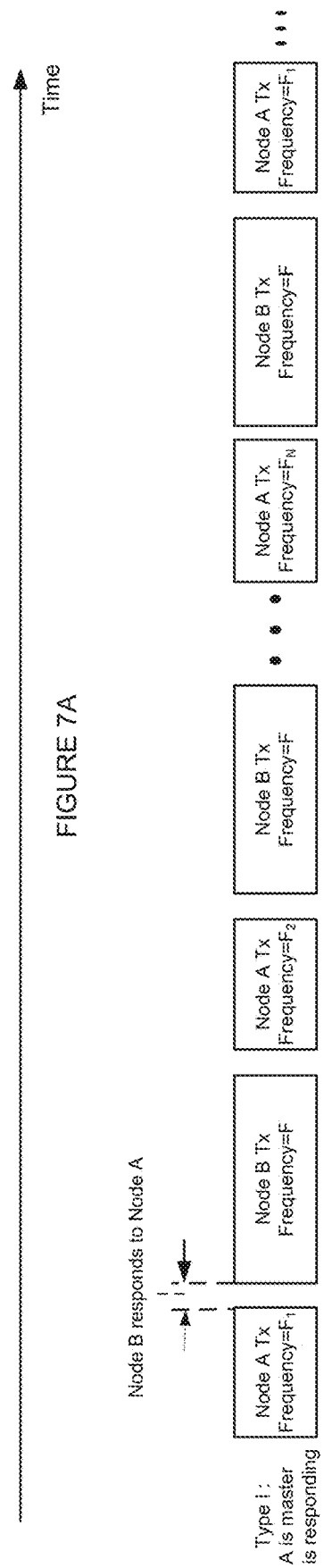
FIGURE 7A
FIGURE 7B

INTERFERING IN TIME-DIVISION DUPLEX COMMUNICATION

RELATED APPLICATION

This application is a continuation U.S. patent application Ser. No. 16/513,769 filing date Jul. 17, 2019 which claims the benefit of priority of Israel Patent Application No. 260726 filed on Jul. 22, 2018, the contents of both are incorporated by reference as if fully set forth herein in their entirety.

FIELD AND BACKGROUND OF THE INVENTION

The present invention, in some embodiments thereof, relates to time division duplex communication and, more particularly, but not exclusively, to interfering with time division duplex communication.

In time division duplex (TDD) communication, transmissions by network nodes are separated into different time slots. In some cases, the nodes use different transmission schemes. For example, one node transmits frequency hopping packets whereas a second node transmits fixed frequency packets during their respective allocated time slots.

Time-division duplexing has a strong advantage in the case where there is asymmetry of the uplink and downlink data rates. As the amount of uplink data increases, more communication capacity can be dynamically allocated, and as the traffic load becomes lighter, capacity can be taken away.

In some cases, wideband jamming signals are used to disrupt communication uplink and/or downlink communication. In order to interfere with Node B's reception of transmissions from Node A, a wide band jamming signal is transmitted towards Node B. The jamming signal may be a high bandwidth (BW) noise signal (such as white Gaussian noise) or any other wide band signal (such as actual data or a chirp signal).

One disadvantage of wideband jamming solutions is possible interference to other communication links in the area. Another disadvantage is loss of power, because the power is distributed over the full bandwidth. In addition, jamming solutions do not use a disconnect command and hence can only cause the two nodes to disconnect by raising the bit error rate (BER) in Node B's reception of Node A.

Another approach to this problem is to transmit a pulsed jamming signal during the Node A time slot at all the known frequencies used by Node A in parallel. The disadvantage of the solutions above is still loss of power, as the power is distributed over Node A's entire frequency range. Also, as in the previous solution, this jamming technique does not contain a disconnect command

Additional Background Art Includes

[1] M. Karlsson et al., "Jamming a TDD Point-to-Point Link Using Reciprocity-Based MIMO", *IEEE Transactions on Information Forensics and Security*, 12(12), pp. 2957-2970, 11 Jul. 2017.

[2] International Patent Application Publication No. WO 93/26124.

[3] K. Grover et al., "Jamming and Anti-jamming Techniques in Wireless Networks: A Survey", *International Journal of Ad Hoc and Ubiquitous Computing* Volume 17 Issue 4, Pages 197-215, December 2014.

[4] International Patent Application Publication No. WO 93/22850.

[5] K. Parlin, "Jamming of Spread Spectrum Communications Used in UAV Remote Control Systems", TALLINN UNIVERSITY OF TECHNOLOGY School of Information Technologies, 2017.

SUMMARY OF THE INVENTION

Embodiments of the invention intend to disconnect and/or interfere with communication between nodes in a TDD communication link in which at least one of the nodes (denoted herein Node A) transmits at different respective frequency bands during different times slots allocated to it (i.e. frequency hopping). Transmissions by Node A are interfered with by transmitting a sequence of high-power short disconnect signals during each time slot allocated to Node A. Each disconnect signal is transmitted during a respective time interval within the Node A time slot. Because the disconnect apparatus transmits over only a single Node A frequency band at any given time interval, the transmission power of the disconnect signal can be maximized at each of the frequency bands during a portion of the Node A time slot. Optionally the disconnect signals are modulated with a disconnect command, which when received by Node B causes Node B to disconnect from Node A. Optionally, the disconnect signals may be a predefined pattern and/or a noise signal aimed at interfering with the communication between Node A and Node B.

In some embodiments disconnect signals are transmitted over more than one frequency band during a given time interval. Although in this embodiment transmission power is divided amongst multiple frequency bands, it is nonetheless higher than it would be if the disconnect signal covered the entire Node A frequency range.

According to a first aspect of some embodiments of the present invention there is provided a method for disconnecting a wireless time-division duplex communication link between a first node transmitting during time slots allocated to the first node and a second node transmitting during separate time slots allocated to the second node. The first node transmits at differing respective frequency bands during its time slots. The method includes:

sub-dividing a time slot allocated to the first node into consecutive time intervals; and transmitting respective disconnect signals during the time intervals. Each of the disconnect signals is transmitted on a frequency band used by the first node. The disconnect signals are transmitted on different frequency bands during at least two of the time intervals.

According to a second aspect of some embodiments of the present invention there is provided an apparatus for disconnecting a wireless time-division duplex communication link between a first node transmitting during time slots allocated to the first node and a second node transmitting during separate time slots allocated to the second node. The first node transmits at differing respective frequency bands during its time slots. The apparatus includes a signal generator and a wireless transmitter. The signal generator sub-divides a time slot allocated to the first node into consecutive time intervals and generates respective disconnect signals for multiple time intervals. Each of the disconnect signals occupies a respective one of the frequency bands. The disconnect signals are on different frequency bands for at least two of the time intervals. The wireless transmitter transmits the disconnect signals at the respective time intervals.

According to some implementations of the first aspect or second aspect of the invention, for at least one of the time intervals the disconnect signal is data modulated.

According to some implementations of the first aspect or second aspect of the invention, for at least one of the time intervals the disconnect signal is modulated with a disconnect command for the second node.

According to some implementations of the first aspect or second aspect of the invention, for at least one of the time intervals the disconnect signal is modulated with a pseudo-random data sequence.

According to some implementations of the first aspect or second aspect of the invention, for at least one of the time intervals the disconnect signal is one of: a predefined jamming signal and a random noise signal.

According to some implementations of the first aspect or second aspect of the invention, transmissions by the second node are monitored and an upcoming time slot of the first node is predicted based on the monitored transmissions.

According to some implementations of the first aspect or second aspect of the invention, transmission of the disconnect signals is initiated when a cessation of transmission by the second node is detected.

According to some implementations of the first aspect or second aspect of the invention, transmissions by the second node are analyzed to identify a disconnection of communication between the first and second nodes, and when such a disconnection is identified, direct communication is established with the second node.

According to some implementations of the first aspect or second aspect of the invention, the respective frequency bands are selected from a specified list of frequency bands.

According to some implementations of the first aspect or second aspect of the invention, disconnect signals are transmitted over an entire frequency range used by the first node during a single time slot.

According to some implementations of the first aspect or second aspect of the invention, the first node transmits in a known order of the frequency bands, and the disconnect signals are transmitted in the known order. The phase of the order of transmitted disconnect signals is changed by transmitting one of the disconnect signals at frequency band out of the known order and continuing subsequent disconnect signal transmissions in the known order. This phase change may be performed more than once while interfering with the transmissions.

According to some implementations of the first aspect or second aspect of the invention, the entire frequency range used by the first node is interfered with by the disconnect signals during a single time slot of the first node.

According to some implementations of the first aspect or second aspect of the invention, the respective frequency bands for the disconnect signals are selected as successive frequency bands over the frequency range used by the first node.

According to some implementations of the first aspect or second aspect of the invention, at least two disconnect signals are transmitted in parallel on respective ones of the frequency bands for at least one of the time intervals. The number of disconnect signals transmitted in parallel is fewer than a total number of the frequency bands.

According to some implementations of the first aspect or second aspect of the invention, a first sub-set of the frequency bands is transmitted during a time slot of the first node and a second sub-set of the frequency bands is transmitted during a subsequent time slot of the first node.

According to third aspect of some embodiments of the present invention there is provided a method for controlling an apparatus interfering with wireless time-division duplex communication. The time-division duplex communication is between a first node transmitting during time slots allocated to the first node and a second node transmitting during separate time slots allocated to the second node. The first node transmits at differing respective frequency bands during its time slots. The method includes:

receiving, using a receiver, wireless transmissions from the second node;

determining a time slot allocated to the first node based on the received transmissions and subdividing the determined time slot into consecutive time intervals; and instructing the apparatus to transmit respective disconnect signals during a plurality of the time intervals, each of the disconnect signals being for transmission on a respective one of the plurality of frequency bands, wherein for at least two of the time intervals the disconnect signals are transmitted on different frequency bands.

According to a fourth aspect of some embodiments of the present invention there is provided a controller for a wireless disconnect apparatus for interfering with wireless time-division duplex communication link The time-division duplex communication is between a first node transmitting during time slots allocated to the first node and a second node transmitting during separate time slots allocated to the second node. The first node transmits at differing respective frequency bands during its time slots. The apparatus includes:

a receiver which receives wireless transmissions from the second node;

a signal analyzer which:

determines a time slot allocated to the first node based on the received transmissions;

subdivides the time slot into consecutive time intervals; and instructs the disconnect apparatus to transmit respective disconnect signals during a plurality of the time intervals, each of the disconnect signals being for transmission on a respective one of the plurality of frequency bands, wherein for at least two of the time intervals the disconnect signals are transmitted on different frequency bands.

According to some implementations of the third aspect or fourth aspect of the invention, at least one signal parameter for generation of the disconnect signals is provided to the apparatus. According to some further implementations of the third aspect or fourth aspect of the invention, the signal parameter includes:

a type of disconnect signal to transmit;

data for modulating onto a disconnect signal;

a duration of the time slot;

respective durations of the time intervals;

the respective frequency bands for the disconnect signals;

respective transmission powers for the disconnect signals; and a number of disconnect signals to transmit in parallel.

According to some implementations of the third aspect or fourth aspect of the invention, the apparatus is instructed to transmit, on at least one of the disconnect signals, a disconnect command for disconnecting the second node from the first node.

According to some implementations of the third aspect or fourth aspect of the invention, disconnection of communication between the first and second nodes is detected from the received transmissions and the apparatus is instructed to establish direct communication with the second node.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit.

As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 6:
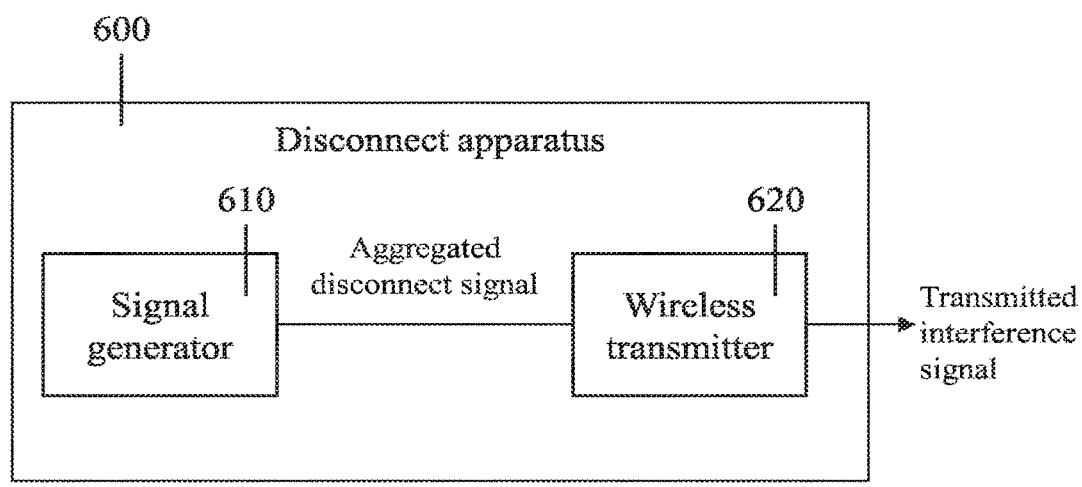
Figure 7C:
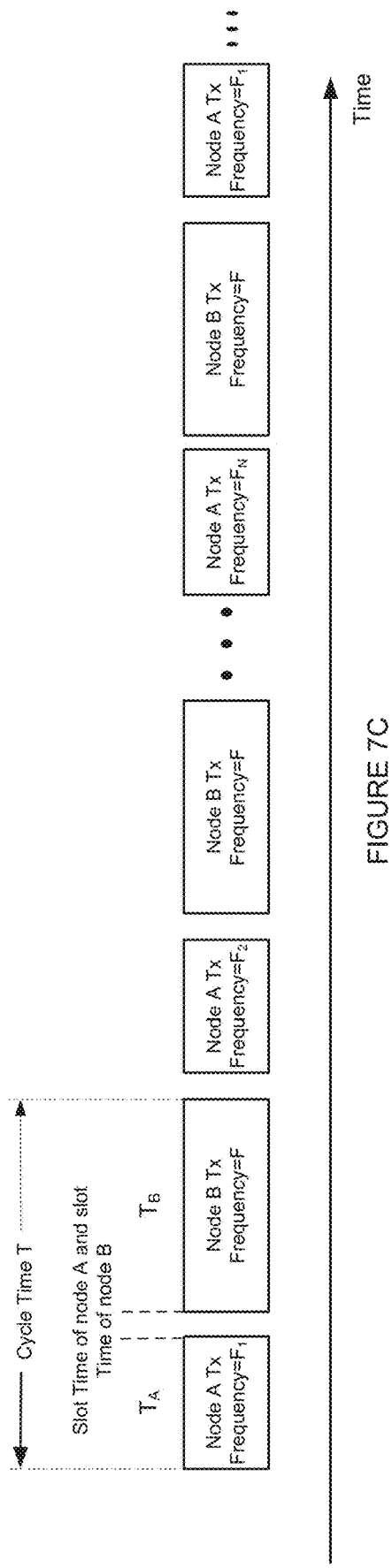
Figure 8:
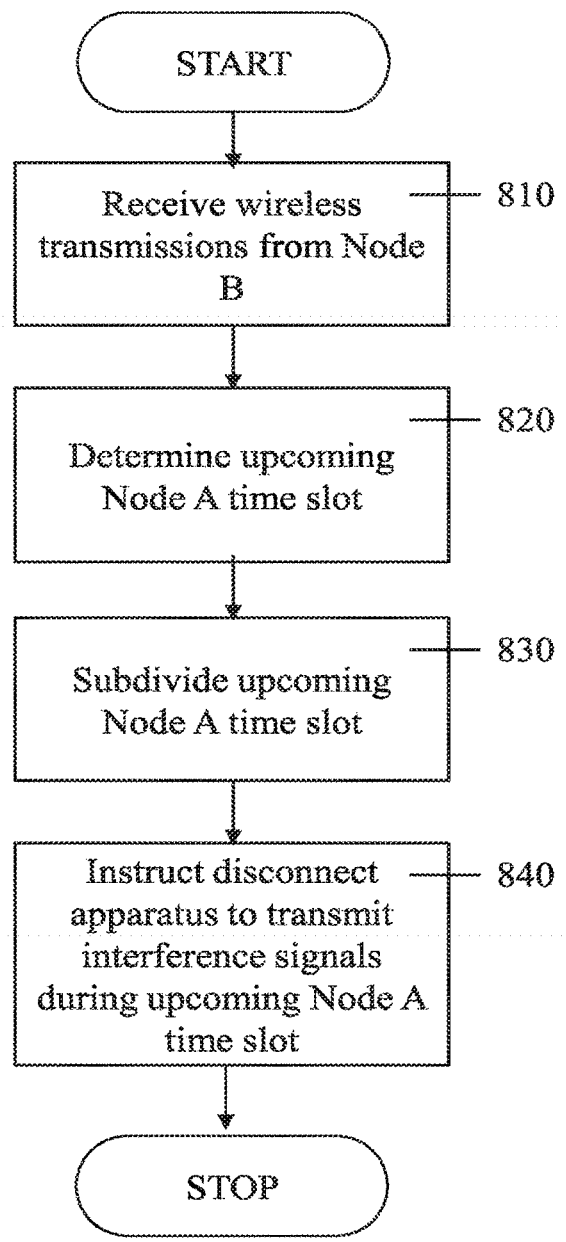
Figure 9:
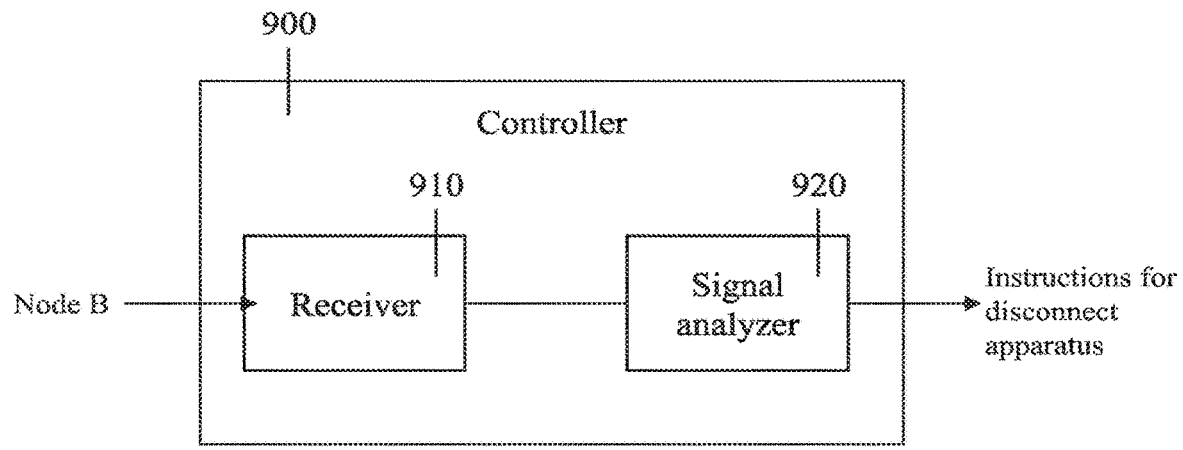
Figure 10:
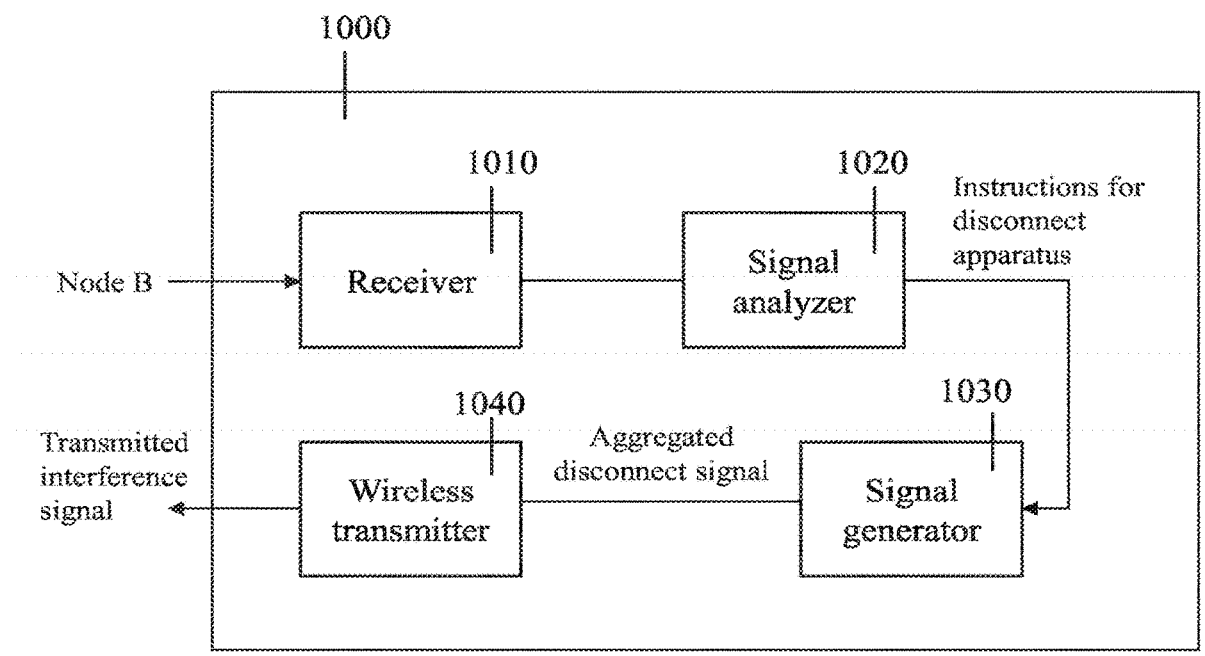

FIGS. 3A-B, 4 and 5 illustrate aggregated disconnect signals used to interfere with a TDD communication link, according to respective exemplary embodiments of the invention;

FIG. 6 is a simplified block diagram of a disconnect apparatus for disconnecting a wireless time-division duplex communication link, according to embodiments of the invention;

FIGS. 7A-7C illustrate respective timing scenarios for TDD communication links;

FIG. 8 is a simplified flowchart of a method for controlling a disconnect apparatus, according to embodiments of the invention;

FIG. 9 is a simplified block diagram of a controller for a wireless disconnect apparatus, according to embodiments of the invention; and FIG. 10 is a simplified block diagram of a disconnect apparatus, according to an exemplary embodiment of the invention.

DESCRIPTION OF SPECIFIC EMBODIMENTS OF THE INVENTION

The present invention, in some embodiments thereof, relates to time division duplex communication and, more particularly, but not exclusively, to interfering with time division duplex communication.

TDD communications links are often used for wireless communication between a controller and an unmanned aerial vehicle (UAV), such as a drone. TDD is particularly suited for this use because of the typical asymmetry of the uplink communication (from controller to UAV) relative to the downlink (from UAV to controller).

Embodiments of the invention interfere with a time-division duplex communication link between two nodes, in order to disconnect the two nodes. The goal is to perform this disconnection with minimal interference to other communication links within the area.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 1:
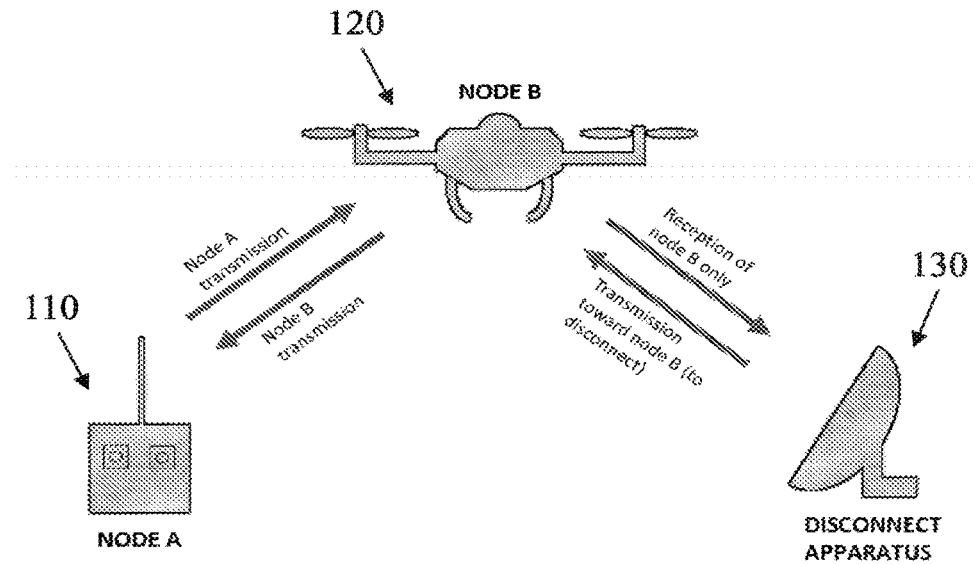
FIG. 1 illustrates an exemplary scenario for interfering with a TDD communication link between nodes A and B.

Reference is now made to FIG. 1, which illustrates an exemplary scenario for interfering with a TDD communication link between two nodes. Node A 110 transmits frequency hopping packets to Node B 120. Node B 120 transmits fixed frequency packets to Node A 110. Node B 120 and Node A 110 transmit in different time frames. Disconnect apparatus 130 transmits signals which are received by Node B 120 and are designed to disconnect Node B 120 from Node A 110. Typically, transmissions from Node B 120 are received by disconnect apparatus 130, but transmissions from Node A 110 are not received and therefore cannot be analyzed by disconnect apparatus 130.

For clarity, the description herein presents non-limiting exemplary embodiments in which the TDD communication link is between two nodes (denoted herein Node A and Node B), and in which it is desired to disconnect Node B from Node A. As will be appreciated by the skilled person, other embodiments of the invention may be implemented for TDD communication links with more than two nodes (e.g. a single controller controlling multiple drones or multiple controllers controlling multiple drones).

I. Method for Interfering with a TDD Communication Link

Figure 2:
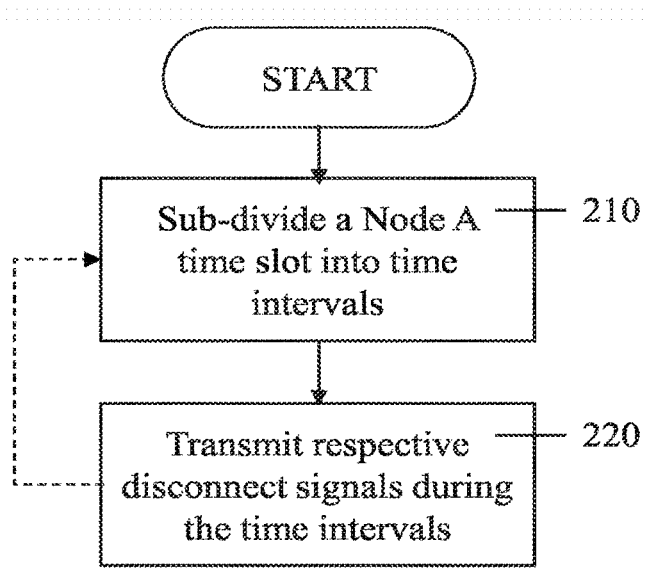
FIG. 2 is a simplified flow chart of a method for disconnecting a wireless time-division duplex communication link, according to embodiments of the invention.

Reference is now made to FIG. 2, which is a simplified flow chart of a method for disconnecting a wireless time-division duplex communication link, according to embodiments of the invention. The time-division duplex (TDD) communication link is between a first node (denoted herein Node A) transmitting during time slots allocated to Node A and a second node (denoted herein Node B) transmitting during separate time slots allocated to Node B.

As used herein the term "separate time slots" means that Node A's time slots do not overlap with Node B's time slots.

Node A transmits at multiple frequency bands. During each of its allocated time slots, Node A transmits at a respective one of these frequency bands. Node A may transmit in a fixed hop pattern (i.e. in a predetermined repetitive order) or the frequency bands used by Node A transmission may vary in a different manner. The frequency bands used by Node A should be known or detectable by Node B, so that Node B is able to receive Node A's transmissions correctly.

In 210, a time slot allocated to the first node is sub-divided into consecutive time intervals. Methods for identifying or determining a Node A time slot are described below.

As used herein the term "consecutive time intervals" means that the time intervals are in a non-overlapping sequence which begins at the start of the time slot and ends at the end of the time slot. Optionally the time interval duration is the same for each of Node A's time slots. Alternately, some or all of the time slots are divided into different sequences of time interval durations.

In 220, respective disconnect signals are transmitted during some or all of the time intervals. Each disconnect signal is transmitted on one of Node A's frequency bands. The disconnect signals are transmitted on different frequency bands during at least two of the time intervals. Optionally, when Node A's frequency bands are not accurately known, disconnect signals are transmitted at frequency bands which are expected to be used by Node A.

Optionally, during a single Node A time the disconnect signals cover the entire frequency range used by the Node A.

Optionally, the respective frequency bands for the disconnect signals are selected from a specified list of frequency bands. The list may include frequency bands known to be used by Node A. This approach is beneficial when Node A does not transmit over a continuous frequency range but rather at certain frequency bands within its total frequency range.

As used herein the term "aggregated disconnect signal" means the entire disconnect signal transmitted in a single time slot. The aggregated disconnect signal is built from the multiple short disconnect signals which are transmitted during respective time intervals within a single time slot. The aggregated disconnect signal may be built in the same manner for all Node A time slots, or in different manners for different time slots. For example, in some Node A time slots the aggregated disconnect signal may cover Node A's entire frequency range whereas in other time slots only a portion or portions of Node A's frequency range is interfered with.

Optionally, a single disconnect signal (i.e. a signal at a single frequency band) is transmitted in each time interval, therefore the transmission power is concentrated in one frequency band.

Figure 3A:
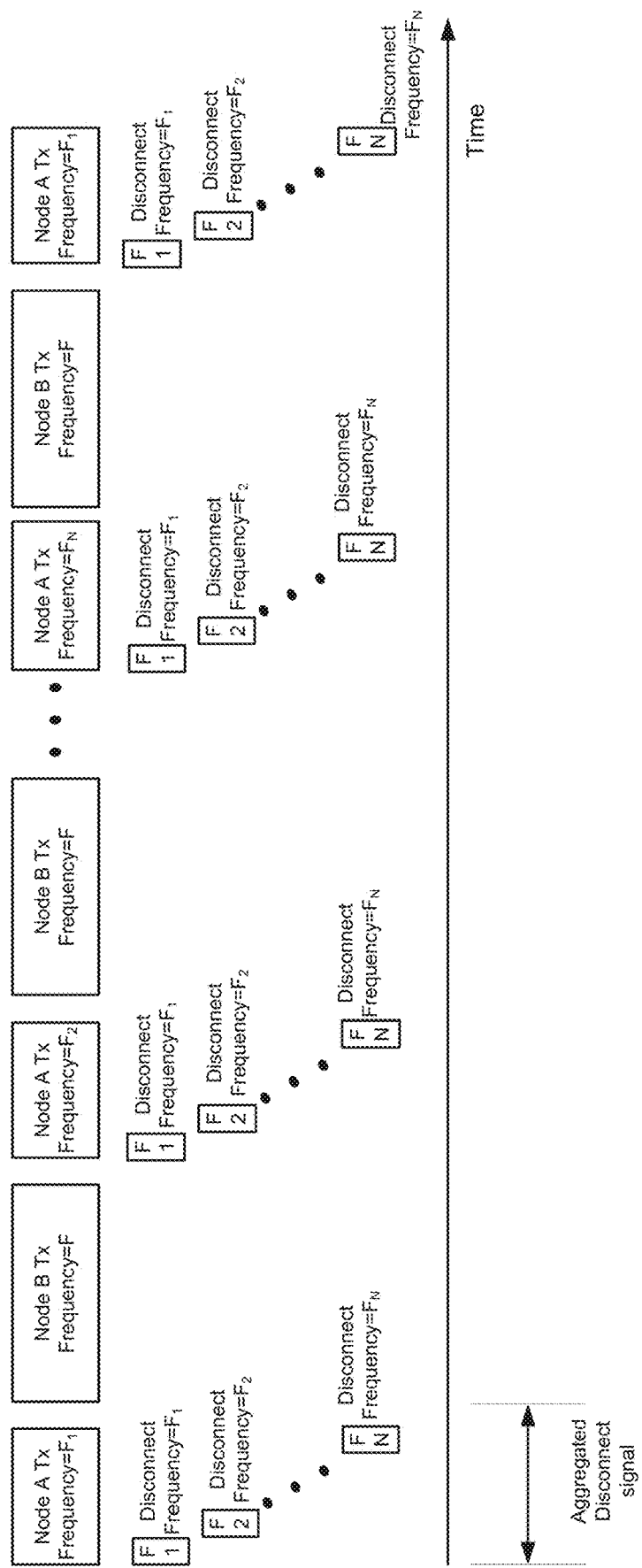

FIG. 3A illustrates an exemplary embodiment in which Node A transmissions are interfered with by the staggered transmission of the disconnect signals during the Node A time slot. The Node A time slot is sub-divided into N time intervals. A singe disconnect signal is transmitted during each of the time intervals. If Node A's frequency bands (F1-FN) cover a continuous frequency range, then the aggregated disconnect signal covers the entire frequency range. If F1-FN are portions of Node A's total frequency range, the aggregated disconnect signal interferes with all frequency bands used by Node A. In FIG. 3A the frequency bands of the aggregated disconnect signal are transmitted in the same order during each Node A time slot.

Figure 3B:
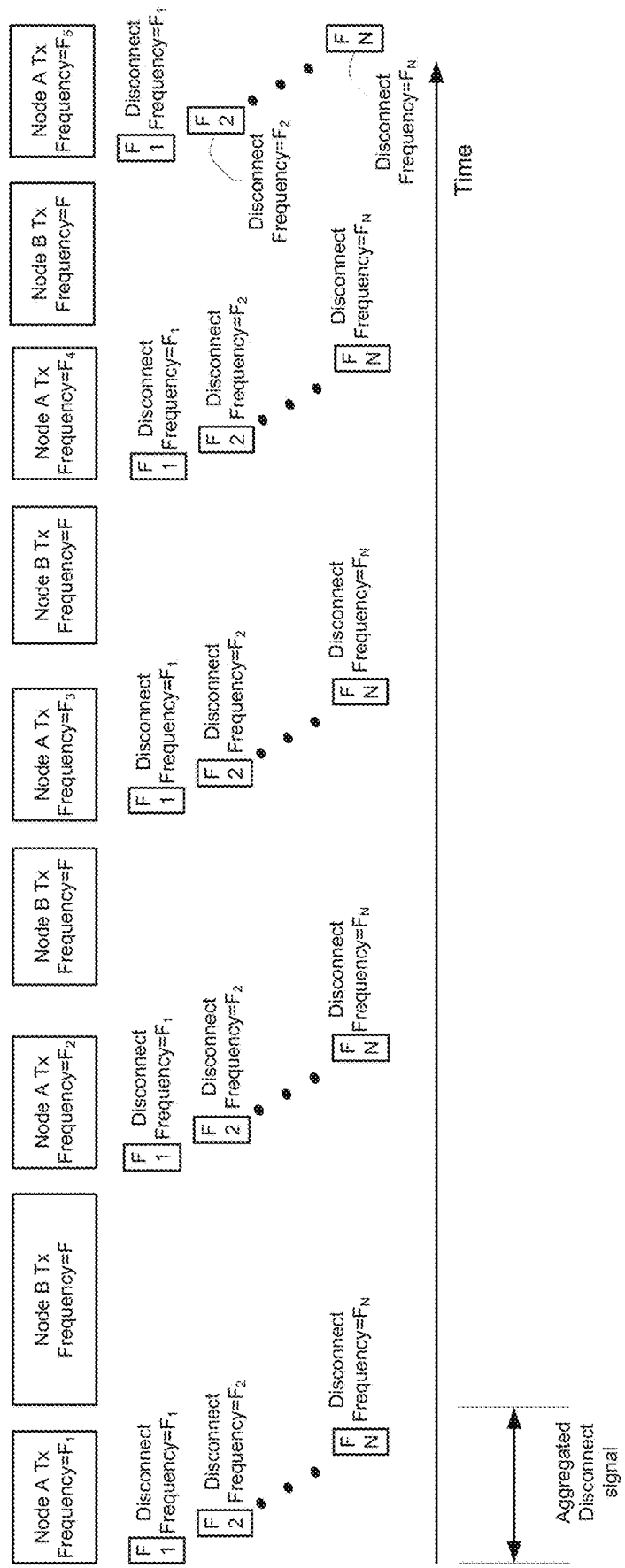

FIG. 3B illustrates an exemplary embodiment in which Node A sends multiple packets at different phases but in a constant cycle. As in FIG. 3A, the Node A transmissions are interfered with by the staggered transmission of the disconnect signals during the Node A time slot.

Figure 4:
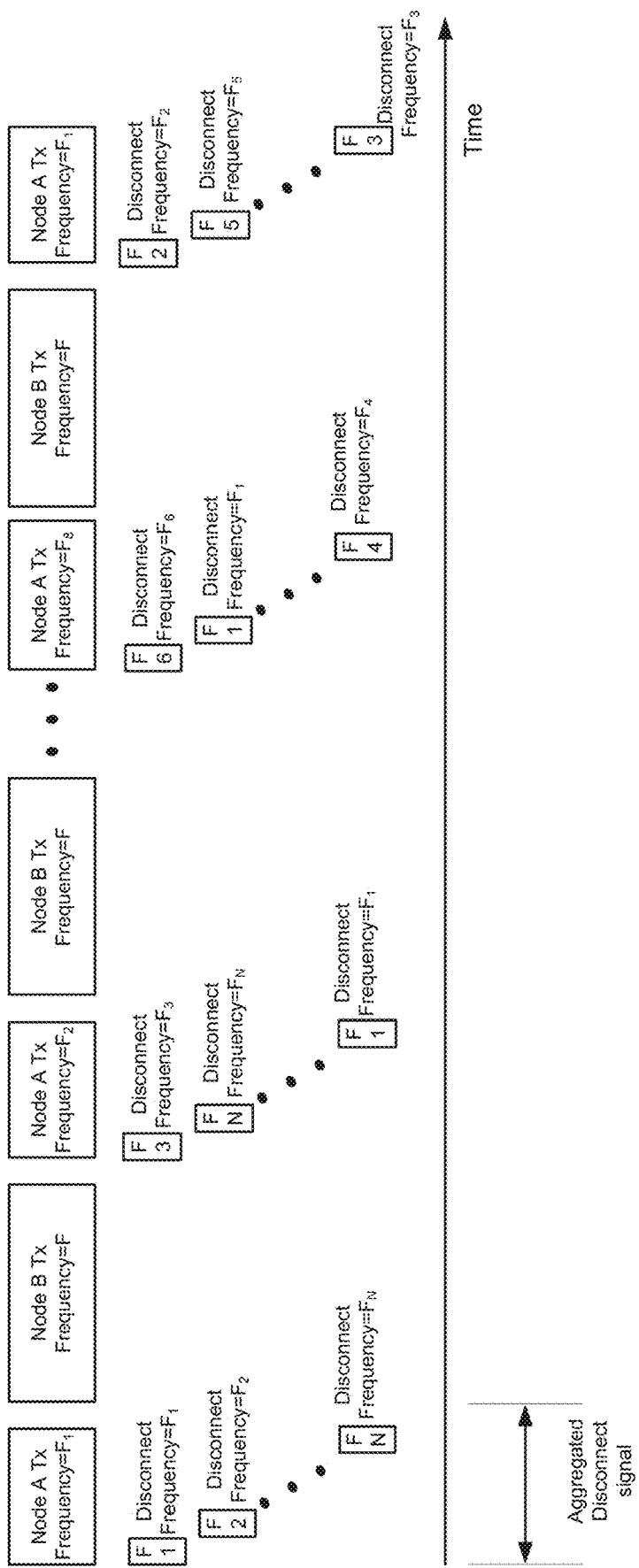

FIG. 4 illustrates an alternate exemplary embodiment in which the order of the frequency bands within the aggregated disconnect signal is different for different Node A time slots.

Figure 5:
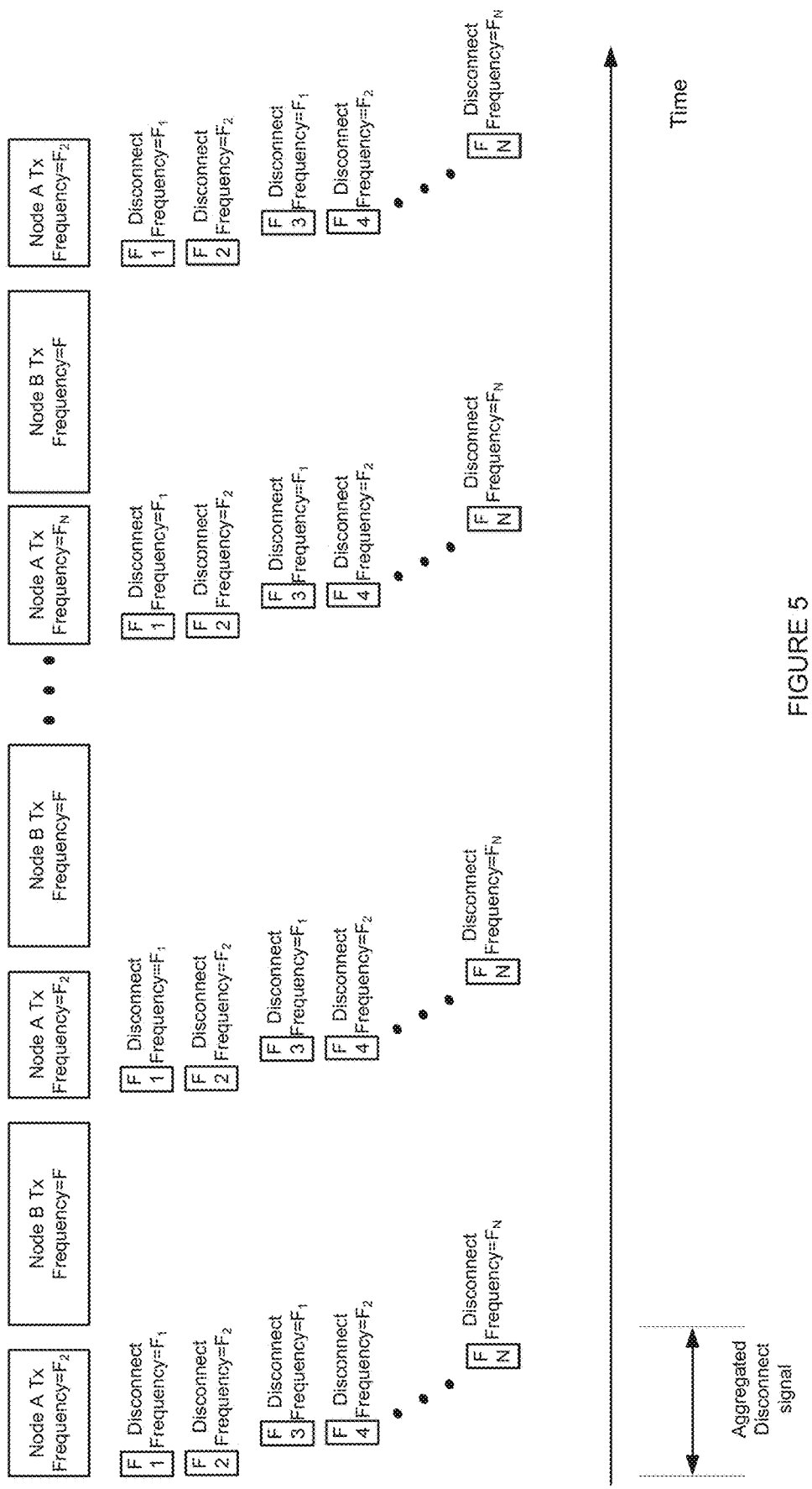

Alternately, during at least one of the time intervals, two or more disconnect signals are transmitted in parallel. FIG. 5 shows an example in which the two disconnect signals at different frequency bands are transmitted during every time interval. Parallel transmission at multiple frequency bands may be useful when the number of time intervals available in a single Node A time slot is fewer than the number of Node A frequency bands. In order to cover all of the Node A frequency bands during a single Node A time slot, it is necessary to transmit at more than one frequency band in a given time interval. This technique may also be beneficial when the available transmission power is high enough to interfere with multiple frequency bands in parallel (e.g. when Node B transmissions are received at a high power indicating that Node B is close).

Optionally, only a subset of the Node A frequency bands is interfered with by a disconnect signal during a single Node A time slot and a second subset of Node A frequency bands is interfered with during a different Node A time slot.

As above, this may be useful when the number of time intervals available in a single Node A time slot is fewer than the number of Node A frequency bands. This embodiment is also useful when there is some knowledge regarding the possible frequency bands that Node A may transmit in.

Assigning respective frequency bands to the time intervals in the aggregated time signal may be done by any means known in the art. Embodiments of assigning frequency bands to respective time intervals include but are not limited to:

i) A predefined order;
ii) According to specified rules; and
iii) Randomly.

The assignment may take into account additional information such as known information about the TDD communication link and/or information gathered by analyzing transmissions received from Node B.

In some embodiments, Node A transmits in a known hop pattern. Although the order of the frequency bands used by Node A is known, the Node A transmissions are not received so it is not known which frequency band is currently being used. This added information may be used to select the interference signals. An optional embodiment includes transmitting rapidly changing disconnect signals based on the known hop pattern, using partial frequencies from the list in order to additionally increase the disconnect signal power. For example, assume it is known that the order of Node A's frequencies is $F_1, F_2, F_3, \ldots, F_N$. Then $F_1, F_2, F_3, F_4$ and $F_5$ may be transmitted together in one aggregated disconnect signal in parallel with the first Node A packet and $F_2, F_3, F_4, F_5$ and $F_6$ may be transmitted together in a second aggregated disconnect signal in parallel with the second Node A packet. After some time, if disconnect is not achieved, the next sequence may be changed.

In this way the correct phase is eventually reached with a higher power, as there are fewer disconnect signals required to achieve disconnect.

II. Types of Disconnect Signals

In many TDD communication links a "disconnect command" may be issued from one of the nodes to the other. The disconnect command informs the recipient that the connection is terminated. The receiving node then terminates its side of the connection. In some cases, the nodes will then try to reestablish their connection in the same or in another timing phase. It is possible to disturb this type of communication by transmitting a disconnect signal carrying a disconnect command to Node B. When the disconnect signal is received by Node B at a higher signal-to-noise ratio (SNR) than the Node A packets, Node B may demodulate the disconnect signal instead of the packet sent by Node A. This causes the link between Node A and Node B to be broken.

Optionally, during at least one of the time intervals the disconnect signal is a data modulated carrier signal. Further optionally, the disconnect signal carries one or more data packets constructed in accordance with the TDD communication link protocol.

Optionally, one or more of the disconnect signals are modulated with a disconnect command or commands for Node B. The disconnect command is built according to the known protocol between Node A and Node B. The disconnect signal is typically a short signal, preferably shorter than $T_A/N$ ($T_A$ is Node A slot time and N is the number of known frequencies). If the shortest disconnect signal time $T_{dis}$ is longer than $T_A/N$, then in order to cover all the Node A frequencies it is necessary to transmit k=floor($N \cdot T_{dis}/T_A$) parallel disconnect signals.

In some cases, such as when the disconnect length is too long or the protocol between Node A and Node B is not known, a different type of disconnect signal may be used. In this case the disconnection is achieved by reducing the SNR of the reception of Node A signal by Node B. This causes a high bit error rate (BER) that will eventually fail the whole packet or frame due to failure in the parity check.

Other types of disconnect signals include but are not limited to:
a) A noise signal, such as a predefined noise pattern, random noise or white Gaussian noise signal;
b) A predefined jamming signal;
c) A modulated pseudo-random binary sequence, optionally using a constant envelope such as BPSK; and
d) A predefined binary sequence modulated as a constant envelope signal (such as any phase shift keying signal).

Using a noise or PSK disconnect signal is beneficial when Node B cannot receive a packet from the disconnect signal due to the parallel reception of Node A's packet).

The aggregated disconnect signal for a single time slot may be expressed as:

$$J(T) = N(t) \cdot \cos(2\pi f(t) t + \phi)$$

where N(t) is the aggregated disconnect signal, f(t) is the carrier frequency and $\phi$ is a constant or random phase. Optionally, N(t) is one of:
i) A sequence of M packets containing the protocol specific command to disconnect; and
ii) A predefined pattern (such as White Gaussian Noise, modulated Pseudo Random Binary Sequence, any modulated binary sequence or any predefined jamming signal).

Regarding Node A's changing carrier frequency f (t):
A) In embodiments in which the disconnect signal carrier frequencies are a linear series $\{f_0 + n \cdot \Delta f\}$:

$$f(t) = f_0 + \Delta f \cdot \sum_{n=1}^{N-1} u(t - T_n)$$

$$T_n = T_{packet} \cdot \frac{n}{N}$$

$$u(t) = \begin{cases} 1 & \text{if } t > 0 \\ 0 & \text{otherwwise} \end{cases}$$

B) In embodiments in which the disconnect signal carrier frequencies are selected from a list $\{f_n\}$:

$$f(t) = \sum_{m=0}^{M-1} f_n \cdot \{u(t - T_n) - u(t - T_{n+1})\}$$

As shown in FIG. 4, the order of the frequencies within the aggregated disconnect signal may be different for transmissions in different time slots.

III. Disconnect Apparatus

Reference is now made to FIG. 6, which is a simplified block diagram of a disconnect apparatus for disconnecting a wireless time-division duplex communication link, according to embodiments of the invention. As described above, the TDD communication link is between Node A which transmits at differing respective frequencies during its allocated time slots and Node B which transmits at a fixed frequency during its time slots.

Disconnect apparatus 600 includes signal generator 610 and wireless transmitter 620.

Signal generator 610 generates the aggregated disconnect signal for each Node A time slot by sub-dividing a time slot allocated to the first node into consecutive time intervals and generating respective disconnect signals for multiple time intervals. Each of the disconnect signals occupies a respective one of the Node A frequency bands, where during at least two of the time intervals the disconnect signals occupy different frequency bands.

In order to interfere with communications between Node A and Node B, the aggregated disconnect signal generated by signal generator 610 is transmitted by transmitter 620 during the respective Node A time slot, in parallel with the Node A transmissions.

As will be appreciated by the skilled person, signal generator 610 may be used to generate any of the disconnect signals and aggregate disconnect signals described herein, as required for a specific embodiment. For example, in some embodiments more than one disconnect signal (at different respective frequency bands) are transmitted during a single time interval.

Optionally, for at least one of the time intervals the disconnect signal is a carrier frequency in the respective frequency band, where the carrier signal is modulated with one of:
a) a disconnect command for the second node (or one of several options of disconnect commands, if several exist);
b) A noise signal, such as a predefined noise pattern, random noise or white Gaussian noise signal;
c) A predefined jamming signal;
d) A pseudo-random binary sequence, optionally using a constant envelope such as BPSK; and
e) A predefined binary sequence (modulated as a constant envelope signal, for example any phase shift keying signal).

Optionally, during a given time slot signal generator 610 selects the respective frequency bands for the disconnect signals from a list of known frequency bands used by the Node A. Alternately or additionally, during a given time slot signal generator 610 selects the respective frequency bands for the disconnect signals as successive frequency bands over a frequency range used by Node A.

Optionally, during a single Node A time slot the entire frequency range used by the Node A is interfered with by the disconnect signals.

In the embodiment of FIG. 6, signal generator 610 and transmitter 620 are a single apparatus. In alternate embodiments, signal generator 610 is an add-on unit which provides the aggregated disconnect signals to a standalone transmitter.

IV. Monitoring Node B communications

Optionally, Node B communications are monitored and analyzed in order to gather information about communication between Node A and Node B and/or parameters of the TDD communication link. The Node B transmissions may be monitored and/or analyzed continuously or intermittently.

Several Node B transmissions may be collected and analyzed in order to predict upcoming Node A time slots. The prediction may also be based on prior knowledge, such as that Node A is transmitting packets in a fixed cycle or that Node A is transmitting several packets in a fixed cycle (e.g. at 10 n msec and at 10 n+4 msec, which are two phases with a 10 msec cycle).

Types of information that may be obtained by this analysis include but are not limited to:

1) Identifying a disconnection between Nodes A and B. Optionally, when the disconnection is identified direct communication is established with Node B (for example by sending Node B a request to connect);

2) Identifying and/or predicting time slot(s) allocated to Node A and/or Node B. Knowledge of the start and/or stop times of the time slots enables transmitting the disconnect signals at the correct time;

3) The communication protocol used by Nodes A and B; and

4) The management of the Node A and Node B time slots (e.g. see FIGS. 7A-7C).

It is desired to transmit the aggregated disconnect signal during the Node A time slot for which it was built. Many ways of allocating time slots in TDD are known in the art. The embodiments presented herein are not limited to any particular type of slot allocation by the TDD communication link.

Alternately or additionally, the beginning of a Node A time slot is detected when Node B sends a request to reconnect. Node B transmissions are optionally analyzed to determine the protocol used by the TDD communication link, so that the request to reconnect may be identified in the Node B transmissions.

The decision when to begin transmission of the aggregated disconnect signal may be based on more of:

1) Detecting the beginning and/or end of Node B transmissions. Several Node B transmissions may be collected and analyzed together in order to "learn" the time slot pattern and predict an upcoming Node A time slot (e.g. transmission packet time) in advance. This may block signals (such as ACK responses) that are transmitted by Node A at the beginning of its time slot.

2) Identifying the transmission of data sent by Node B (such as a request to reconnect, an ACK packet, a disconnect command, etc.).

3) Prior knowledge of the access scheme.

Exemplary Embodiments Include

1) The aggregated disconnect signal is transmitted a predefined time after the Node B transmission ends. This approach is effective when Node B is the master and manages the time frames and Node A responds to Node B, as illustrated in FIG. 7A.

2) The aggregated disconnect signal is transmitted a predefined time before a predicted Node B time slot. This approach is effective in the timing scenarios illustrated in FIGS. 7B and 7C. In FIG. 7B, Node A is the master and Node B responds to Node B, typically after a relatively short buffer time. FIG. 7C illustrates the case where the cycle time, T, and slot times, TA and TB, are determined in advance, for example when the link is created. If this pattern is known, once a Node A or Node B time slot is identified the timing of future time slots is known.

V. Controlling a Disconnect Apparatus

Reference is now made to FIG. 8, which is a simplified flowchart of a method for controlling a disconnect apparatus interfering with wireless time-division duplex communication, according to embodiments of the invention. This control is based on information gathered by receiving and analyzing signals transmitted by Node B.

In 810, wireless transmissions are received from Node B.

In 820, an upcoming Node A time slot is determined based on the received transmissions. Optional techniques for performing this determination are described above (e.g. identifying the end of a Node B time slot, by prior knowledge of the timing of the time slots, etc.).

In 830, the upcoming Node A time slot is subdivided into consecutive time intervals.

In 840, the disconnect apparatus is instructed to transmit, during the Node A time slot determined in 820, an aggregated disconnect signal is built based on the respective frequency bands assigned to time intervals within the time slot. The frequency band assignment may be designed to yield any type or types of aggregated disconnect signals described herein, as required for a specific embodiment.

Optionally, the instructions to the disconnect apparatus include at least one signal parameter for generation of the disconnect signals. Signal parameters for generating the disconnect signals include but are not limited to:

i) Type of disconnect signal to transmit;
ii) Data for modulating onto the disconnect signal;
iii) The duration of the time slot;
iv) Respective durations of the time intervals;
v) Respective frequency bands for the disconnect signals;
vi) Respective transmission powers for the disconnect signals; and
vii) The number of disconnect signals to transmit in parallel.

Optionally, the disconnect apparatus is instructed to modulate a disconnect command onto at least one of the disconnect signals.

Optionally, the method further includes detecting that Node A and Node B are disconnected (e.g. the TDD communication link has been successfully interfered with). The disconnect apparatus is then instructed to establish direct communication with the Node B. Optionally, communication is established with Node B by transmitting a request to connect with Node B at high power.

VI. Controller for Disconnect Apparatus

Reference is now made to FIG. 9, which is a simplified block diagram of a controller for a wireless disconnect apparatus, according to embodiments of the invention. Controller 900 includes receiver 910 and signal analyzer 920, which together implement the method shown in FIG. 8.

Receiver 910 receives wireless transmissions from the Node B. Signal analyzer 920 analyzes the received signals to determine an upcoming time slot allocated to Node A and to subdivide the Node A time slot into consecutive time intervals. Signal analyzer 920 also instructs the disconnect apparatus how the aggregated disconnect signal should be built and when it should be transmitted.

Optionally, receiver 910 performs analog and/or digital processing on the received signal before providing it signal analyzer 920. For example, receiver 910 may include an analog-to-digital converter which converts the received Node B signal to a digital signal which is analyzed by signal analyzer 920.

In the embodiment of FIG. 9, receiver 910 and signal analyzer 920 are a single apparatus. In alternate embodiments, signal analyzer 920 is an add-on unit which provides the aggregated disconnect signals to a standalone transmitter.

VII. Exemplary Disconnect Apparatus

Reference is now made to FIG. 10, which is a simplified block diagram of a disconnect apparatus, according to an exemplary embodiment of the invention. Disconnect apparatus 1000 includes the components shown in FIGS. 6 and 9. Receiver 1010 receives signals transmitted by Node B. Signal analyzer 1020 analyzes the received signals, determines an upcoming Node A time slot and/or decides how the aggregated disconnect signal should be built for the Node A time slot. These instructions are provided to signal generator 1030, which generates the aggregated disconnect signal for transmission by wireless transmitter 1040.

The combined operation of signal analyzer 1020 and signal generator 1030 may perform any of the analyses described herein and generate any of the disconnect signals and aggregated disconnect signals described herein. For brevity, the complete details of all possible embodiments are not repeated but they are encompassed by disconnect apparatus 1000.

In the embodiment shown in FIG. 10, receiver 1010, signal analyzer 1020, signal generator 1030 and transmitter 1040 form a single apparatus. In alternate embodiments, the receiver and/or transmitter are external.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant TDD communication links, communication protocols and nodes communicating over a TDD communication link will be developed and the scope of the term TDD, TDD communication link, protocol and node is intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 6, from 2 to 4, from 2 to 6, from 3 to 6 etc., as well as individual numbers within that range, for example, 1, 2, 3, 4, 6, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A non-transitory computer readable storage medium having computer readable program instructions thereon for causing a processor to carry out the steps of:
sub-dividing a time slot into consecutive time intervals, the time slot belongs to multiple time slots allocated to a first node for transmitting to a second node using a wireless time-division duplex communication link between the first node and the second node, the second node transmitting during separate time slots allocated to said second node; and disrupting communication between said first node and said second node by transmitting, using a transmitter, respective interference signals during at least some of said time intervals, each of said interference signals being transmitted on one of said frequency bands, wherein for at least two of said time intervals said interference signals are transmitted on different frequency bands.

2. A non-transitory computer readable storage medium according to claim 1, wherein for at least one of said time intervals said interference signal is data modulated.

3. A non-transitory computer readable storage medium according to claim 1, wherein for at least one of said time intervals said interference signal is modulated with a disconnect command for said second node.

4. A non-transitory computer readable storage medium according to claim 1, wherein for at least one of said time intervals said interference signal is modulated with a pseudo-random data sequence.

5. A non-transitory computer readable storage medium according to claim 1, wherein for at least one of said time intervals said interference signal comprises one of: a predefined jamming signal; and a random noise signal.

6. A non-transitory computer readable storage medium according to claim 1, having computer readable program instructions thereon for further causing the processor to carry out the steps of: monitoring transmissions by said second node; and predicting an upcoming time slot of said first node based on said monitored transmissions.

7. A non-transitory computer readable storage medium according to claim 1, having computer readable program instructions thereon for further causing the processor to carry out the steps of initiating said transmitting of said interference signals when a cessation of transmission by said second node is detected.

8. A non-transitory computer readable storage medium according to claim 1, having computer readable program instructions thereon for further causing the processor to carry out the steps of analyzing transmissions by said second node to identify a disconnection of communication between said first and second nodes; and when said disconnection is identified, establishing direct communication with said second node.

9. A non-transitory computer readable storage medium according to claim 1, having computer readable program instructions thereon for further causing the processor to carry out the steps of selecting said respective frequency bands from a specified list of frequency bands.

10. A non-transitory computer readable storage medium according to claim 1, wherein, during a single time slot, interference signals are transmitted over an entire frequency range used by said first node.

11. A non-transitory computer readable storage medium according to claim 1, wherein said first node transmits in a known order of said frequency bands, wherein the computer readable storage medium having computer readable program instructions thereon for further causing the processor to carry out the steps of: transmitting said interference signals in said known order; and changing a phase of said order of transmitted interference signals by transmitting one of said interference signals at frequency band out of said known order and continuing subsequent interference signal transmissions in said known order.

12. A non-transitory computer readable storage medium according to claim 1, wherein an entire frequency range used by said first node is interfered with by said interference signals during a single time slot of said first node.

13. A non-transitory computer readable storage medium according to claim 1, having computer readable program instructions thereon for further causing the processor to carry out the steps of transmitting, for at least one of said time intervals, at least two interference signals in parallel on respective ones of said frequency bands, wherein a number of interference signals transmitted in parallel is fewer than a total number of said frequency bands.

14. A non-transitory computer readable storage medium according to claim 1, having computer readable program instructions thereon for further causing the processor to carry out the steps of transmitting a first sub-set of said frequency bands during said time slot of said first node and a second sub-set of said frequency bands during a subsequent time slot of said first node.

15. A non-transitory computer readable storage medium having computer readable program instructions thereon for causing a processor to carry out the steps of:

receiving, using a receiver, wireless transmissions, from a second node; wherein the second node communicates with a first node by time-division duplex communication, wherein the first node transmitting during time slots allocated to said first node and the second node transmitting during separate time slots allocated to said second node, said first node transmitting at a respective one of a plurality of frequency bands during each of said time slots allocated to said first node;

determining a time slot allocated to said first node, out of the time slots allocated to said first node, the determining is based on said received transmissions;

subdividing said determined time slot into consecutive time intervals; and instructing an apparatus interfering with said time-division duplex communication to transmit respective interference signals during a plurality of said time intervals, each of said interference signals being for transmission on a respective one of said plurality of frequency bands, wherein for at least two of said time intervals said interference signals are transmitted on different frequency bands.

16. A non-transitory computer readable storage medium according to claim 15, having computer readable program instructions thereon for further causing the processor to carry out the steps of providing to said apparatus at least one signal parameter for generation of said interference signals.

17. A non-transitory computer readable storage medium according to claim 16, wherein said at least one signal parameter comprises: a type of interference signal to transmit; data for modulating onto an interference signal; a duration of said time slot; respective durations of said time intervals; said respective frequency bands for said interference signals; respective transmission powers for said interference signals; and a number of interference signals to transmit in parallel.

18. A non-transitory computer readable storage medium according to claim 15, wherein said instructing comprises instructing said apparatus to transmit, on at least one of said interference signals, a disconnect command for disconnecting said second node from said first node.

19. A non-transitory computer readable storage medium according to claim 15, having computer readable program instructions thereon for further causing the processor to carry out the steps of: detecting, from said received transmissions, a disconnection of communication between said first and second nodes; and instructing said apparatus to establish direct communication with said second node.

* * * * *